United States Patent [19]
Ozaki et al.

[11] Patent Number: 4,789,379
[45] Date of Patent: Dec. 6, 1988

[54] BICYCLE DERAILEUR

[75] Inventors: Nobuo Ozaki; Tsukasa Wauke, both of Osaka, Japan

[73] Assignee: Maeda Industries, Ltd., Osaka, Japan

[21] Appl. No.: 105,020

[22] Filed: Oct. 6, 1987

[51] Int. Cl.$^4$ .......................................... F16H 9/06
[52] U.S. Cl. .................................................... 474/82
[58] Field of Search ................................. 474/78–82

[56] References Cited

U.S. PATENT DOCUMENTS 4,241,617 12/1980 Nagano et al. ..................... 474/82

FOREIGN PATENT DOCUMENTS 53-11742 4/1978 Japan .

Primary Examiner—Thuy M. Bui
Attorney, Agent, or Firm—Birch, Stewart, Kolasch & Birch

[57] ABSTRACT

A bicycle deraileur comprising a parallelogrammic linkage mechanism including a base member, a first link pivotally connected at one end thereof to the base member by a first pin, a second link pivotally connected at one end thereof to the base member by a second pin, and a movable member pivotally connected to the other ends of the first and second links by third and fourth pins respectively; a chain guide mechanism carried by the movable member; an operating member pivotally mounted on the firs pin for operation by a cable and provided with a pin; a torsion spring arranged on the first pin to engage with the operating member and the first link, the spring elastically urging the operating member to counteract a tension applied to the cable; and a restraining link pivotally connected at one end to the fourth pin and having a slot extending from the other end toward the fourth pin and slidably receiving the pin of the operating member.

7 Claims, 6 Drawing Sheets

BICYCLE DERAILEUR

BACKGROUND OF THE INVENTION

1. Field of the Invention

This invention relates to a bicycle deraileur of the type which comprises a parallelogrammic linkage mechanism and a chain guide mechanism supported thereby, wherein the linkage mechanism is forcibly deformed against the restoring force of a return spring by a control cable to laterally displace the chain guide mechanism for shifting one sprocket to another diametrically different sprocket. More particularly, the invention relates to such a deraileur which is capable of pre-loading or pre-torsioning the return spring even if the chain guide mechanism is locked in its lateral movement.

2. Description of the Prior Art

As is well known, a typical bicycle deraileur comprises a parallelogrammic linkage mechanism mounted to a suitable portion of a bicycle frame and a chain guide mechanism supported by the linkage mechanism. More specifically, the linkage mechanism includes a base member fixed to the bicycle frame, a pair of parallel links each pivotally pinned at one end to the base member, and a movable member pivotally pinned to the other end of each link. In the case of a rear deraileur, the chain guide mechanism is located adjacent to a multiple freewheel and comprises a spring-biased shift frame pivotally mounted to the movable member of the linkage mechanism and supporting a pair of pulleys for engagement with a chain. In the case of a front deraileur, on the other hand, the chain guide mechanism is positioned adjacent to a multiple chainwheel and comprises a pair of guide plates arranged on both sides of the chain as fixed on the movable member of the linkage mechanism.

The linkage mechanism is usually biased toward its normal position by a return spring. Typically, such spring is mounted on a pin connecting two adjacent parts (e.g. the base member and one of the links) of the linkage mechanism and has both ends engaging with these two parts.

The linkage mechanism is pivotally deformable by a control cable extending from a remote speed change lever for connection to one of the links. Thus, when the speed change lever is operated in one direction, the linkage mechanism is pivotally deformed against the elastic force of the return spring to displace the guide mechanism laterally of the freewheel (rear deraileur) or the chainwheel, thereby shifting the chain from one sprocket to another diametrically different sprocket. When the speed change lever is operated in the reverse direction, the torsioned return spring functions to bring the linkage mechanism toward its original position.

In the above prior art deraileur, the return spring is torsioned as much as the linkage mechanism is pivotally deformed. More specifically, if the two adjacent parts of the linkage mechanism engaging with the spring ends are pivoted by an angle of 45° for example relative to each other upon pivotal deformation of the linkage mechanism, the return spring is also torsioned by an angle of 45°. In other words, the elastic restoring force of the return spring increases in proportion to pivotal angle of the linkage mechanism, causing a large difference in restoring force of the spring between the normal position of the linkage mechanism and the maximally deformed position thereof. Such largely increasing returning force of the spring results in deteriorated operability of the speed change lever because the lever must be imparted a sufficient friction which resists a maximally increased returning force of the spring to prevent spontaneous pivotal movement of the lever.

It is conceivable to increase the number of helixes of the return spring for the purpose of reducing the variation in restoring force per unit pivotal deformation of the parallelogrammic linkage mechanism. However, such an attempt renders the spring very bulky, which causes troubles in assembly of the deraileur or otherwise requires enlargement of the deraileur with attendant weight increase.

Further, with the prior art deraileur, the control cable is connected directly to one of the links, so that the speed change lever is not operable independently of the linkage mechanism. This means that when the bicycle is not running, the chain engaging with or locked on one sprocket prevents the chain guide mechanism or the movable member of the linkage mechanism from moving laterally. Thus, it is impossible in such a locked state to operate the speed change lever.

Japanese Patent Publication No. 53-11742 (Published: Apr. 24, 1987; Application No.: 49-143965; Filed: Dec. 12, 1974; Applicant: Shimano Industrial Co., Ltd.; Inventor: Mitsuhide ISOBE) discloses a bicycle rear deraileur which is capable of pre-loading a spring-biased parallelogrammic linkage mechanism. More particularly, the linkage mechanism is provided with an operating member which is pivotally mounted on a pin which connects a base member to a first one of two parallel links. The operating member is always urged by a return spring in a pivotal direction to engage with the first link which in turn is urged by a weaker counteracting spring in an opposite pivotal direction. The operating member is connected to a control cable which, when tensioned by a remote speed change lever, causes the operating member to pivot away from the first link against the restoring force of the first spring.

With the deraileur of the above publication, when the speed change lever is operated to tension the control cable, the operating member starts moving away from the first link which, however, follows the operating member under the action of the counteracting spring, thereby pivotally deforming the linkage mechanism as a whole for speed change shifting. When the control cable is freed from tension, on the other hand, the restoring force of the return spring overcomes the elastic force of the weaker counteracting spring to bring the operating member and the first link to their respective original positions.

If the parallelogrammic linkage mechanism is locked for example due to non-running of the bicycle, the operating member alone can be pivoted by tensioning the control cable by means of the speed change lever. Such pre-pivoting of the operating member, i.e., pre-loading of the return spring, puts the locked linkage mechanism in a standby condition for shifting since the first link is always under the action of the counteracting spring. Thus, upon start of the bicycle, the linkage mechanism will be immediately deformed by the elastic force of the counteracting spring.

The deraileur of the Japanese publication, however, has a disadvantage of requiring two separate springs which complicates the overall structure and necessitates exact balancing the two springs.

SUMMARY OF THE INVENTION

It is, therefore, an object of the present invention to provide a bicycle deraileur incorporating a parallelogrammic linkage mechanism in which a single spring can provide a returning force as well as a pre-loading function.

Another object of the invention is to minimize variation in restoring force of the return spring despite large pivotal deformation of the linkage mechanism.

According to the present invention, there is provided a bicycle deraileur comprising: a parallelogrammic linkage mechanism including a base member, a pair of parallel links each pivotally connected at one end thereof to the base member by means of a pin, and a movable member pivotally connected to the other end of each link by means of a pin; a chain guide mechanism carried by the movable member; an operating member mounted on the linkage mechanism and operable by a cable to pivot about an axis parallel to the pins; a torsion spring arranged to engage with the operating member and one of the links, the spring elastically urging the operating member to counteract a tension applied to the cable; and restraining means connecting between a first connecting point on the operating member and a second connecting point on the linkage mechanism to convert pivotal movement of the operating member into smaller pivotal movement of the links, the restraining means allowing the first and second connecting points to move toward each other to torsion the spring.

Other objects, features and advantages of the invention will become apparent from the following description of a preferred embodiment given with reference to the accompanying drawings.

DETAILED DESCRIPTION

The drawings illustrate a bicycle rear deraileur for selectively shifting a chain from one sprocket to another of a multiple freewheel. However, the invention is also applicable to a front deraileur which is operated to shift a chain from one sprocket to another of a multiple chainwheel.

Figure 1:
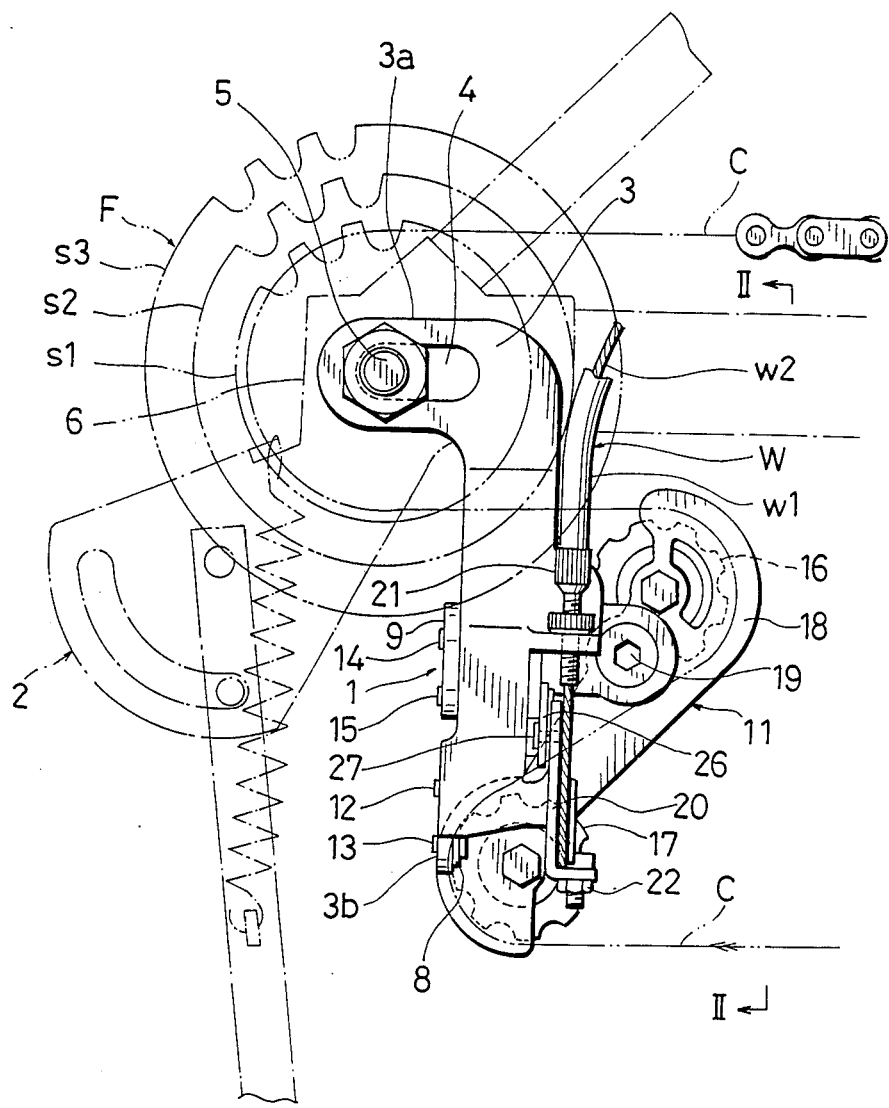
FIG. 1 is a side elevation illustrating a rear deraileur embodying the invention.

Referring now to FIG. 1, the rear deraileur 1 of the illustrated embodiment is particularly designed for mounting to a bicycle of the type which has a bicycle stand 2. Such a type of bicycle is mainly manufactured for general use or for ladies.

The deraileur 1 comprises a base member 3 having an upper end portion 3a clamped to a rear fork end 4 together with a stand fitting 6 (see also FIG. 2) as supported on a hub shaft 5 which also support a multiple freewheel F. The base member 3 extends forward at its upper end portion to clear the stand 2 and then downward to provide a lower support portion 3b.

Figure 2:
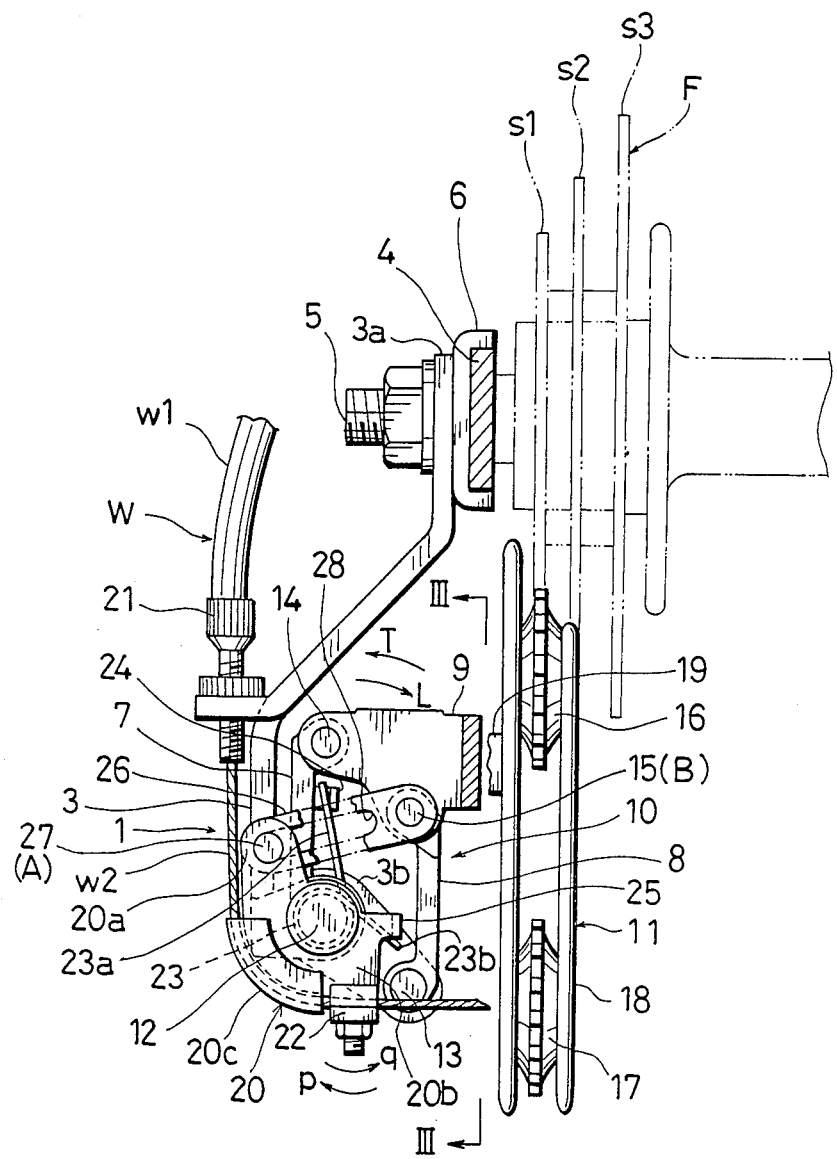
FIG. 2 shows the same deraileur as viewed in the direction of arrows II—II in FIG. 1.
Figure 3:
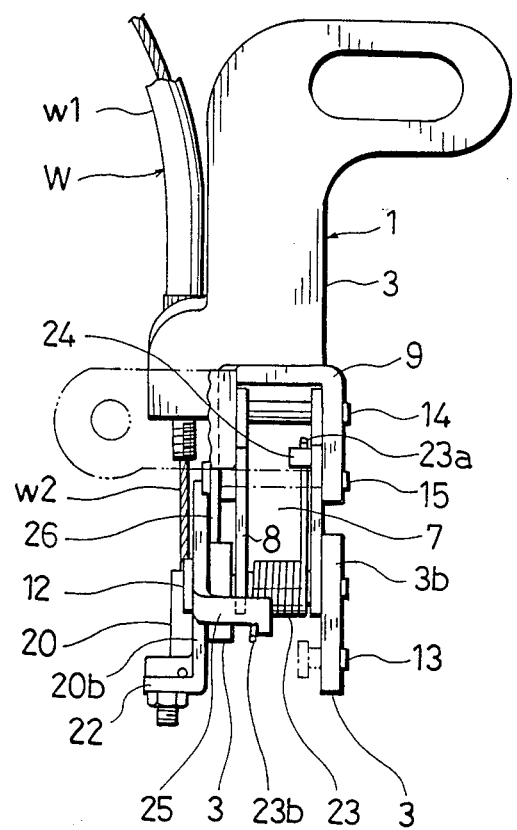
FIG. 3 shows a principal portion of the deraileur as viewed in the direction of arrows III—III in FIG. 2.

As better illustrated in FIG. 2, a pair of laterally spaced parallel links 7, 8 are pivotally connected at their respective lower ends to the lower support portion 3b of the base member 3 by means of pins 12, 13, respectively. The respective upper ends of the links 7, 8 are in turn pivotally connected to a movable member 9 by means of pins 14, 15. The four pins 12-15 are positioned at the four corners of a parallelogram. Thus, the base member 3 (more accurately the lower support portion 3b thereof), the two links 7, 8, and the movable member 9 constitute a well known parallelogrammic linkage mechanism 10.

The arrangement of the linkage mechanism 10 is such that the movable member 9 translate laterally toward and away from the multiple freewheel F in response to deformation of the linkage mechanism 10. To distinguish between the two links 7, 8 in the following description, the link 7 is referred to as "first link", while the other link 8 is referred to as "second link".

The deraileur 1 further comprises a chain guide mechanism 11 mounted to the linkage mechanism 10. More specifically, the guide mechanism 11 includes a downwardly extending shift frame 18 which is pivotally mounted at an upper portion thereof to the movable member 9 of the linkage mechanism 10. The shift frame 18 is provided at its upper end with a guide pulley 16 and at its lower end with a tension pulley 17. The shift frame 18 is always urged by an unillustrated spring so that the lower end of the frame 18 supporting the tension pulley 17 is forcibly moved rewardly.

A chain C is guided around a rear half of the tension pulley 17 and then around a front half of the guide pulley 16 to engage with one of sprockets s1-s3 of the freewheel F, the chain C further extending forwardly toward a chainwheel (not shown). Since the shift frame 18 is urged as described above, the tension pulley 17 moves reward upon shifting of the chain C from a larger sprocket s3 or s2 to a smaller sprocket s2 or s1 to eliminate sagging of the chain and to keep it under a suitable tension.

The structure and arrangement described above are known and do not feature the present invention. The features of the invention resides in the following arrangement of an operating member and a restraining mechanism.

The operating member represented by reference numeral 20 is pivotally supported on the pin 12 which connects the first link 7 to the lower end portion 3b of the base member 3. The operating member 20 has an upwardly extending arm portion 20a, a downwardly extending connecting portion 20b, and an intermediate arcuate guide portion 20c substantially centered about the pin 12.

The operating member 20 is operated by a remote speed change lever (not shown) through a double type control cable W. More specifically, the control cable W consist of an outer cable w1 having one end connected to an intermediate portion of the base member 3 by means of an adjustable screw 21, and an inner cable w2 having one end guided along the arcuate guide portion 20c of the operating member 20 to be connected to the connecting portion 20b thereof by means of a clamping member 22. Thus, the operating member 20 is pivotable in response to a pull on the inner cable w1.

Further provided on the pin 12 is a torsion spring 23. One end 23a of the spring 23 engages with a stopper projection 24 formed on the first link 7, whereas the other end 23b of the spring engages with a similar stopper projection 25 formed on the operating member 20. In the normal position illustrated in FIG. 2, the spring 23 is kept under a predetermined torsion so that the first link 7 is pivotally biased in a direction of an arrow L relative to the operating member 20 which in turn is pivotally urged in a direction of an arrow q relative to the first link 7.

The restraining mechanism according to the illustrated example is provided in the form of a restraining link 26 which connects a predetermined point A on the operating member 20 to another predetermined point B on the parallelogrammic linkage mechanism 10. In the illustrated example, the connecting point A is provided by a pin 27 mounted on the arm portion 20a of the operating member 20, whereas the connecting point B is provided by the pin 15 which pivotally connects the second link 8 of the linkage mechanism 10 to the movable member 9. One end of the restraining link 26 is pivotally connected to the pin 15 (B). The restraining link 26 is formed with an elongated slot 28 which extends from the other end thereof toward the pin 15 and movably receives the pin 27 on the operating member 20. Thus, the restraining link 26 limits the maximum distance between the two pins 27, 15 (points A, B) but allows them to move toward each other. The purpose of the restraining link 26 will be fully described below with reference to FIGS. 5 and 6.

Figure 4:
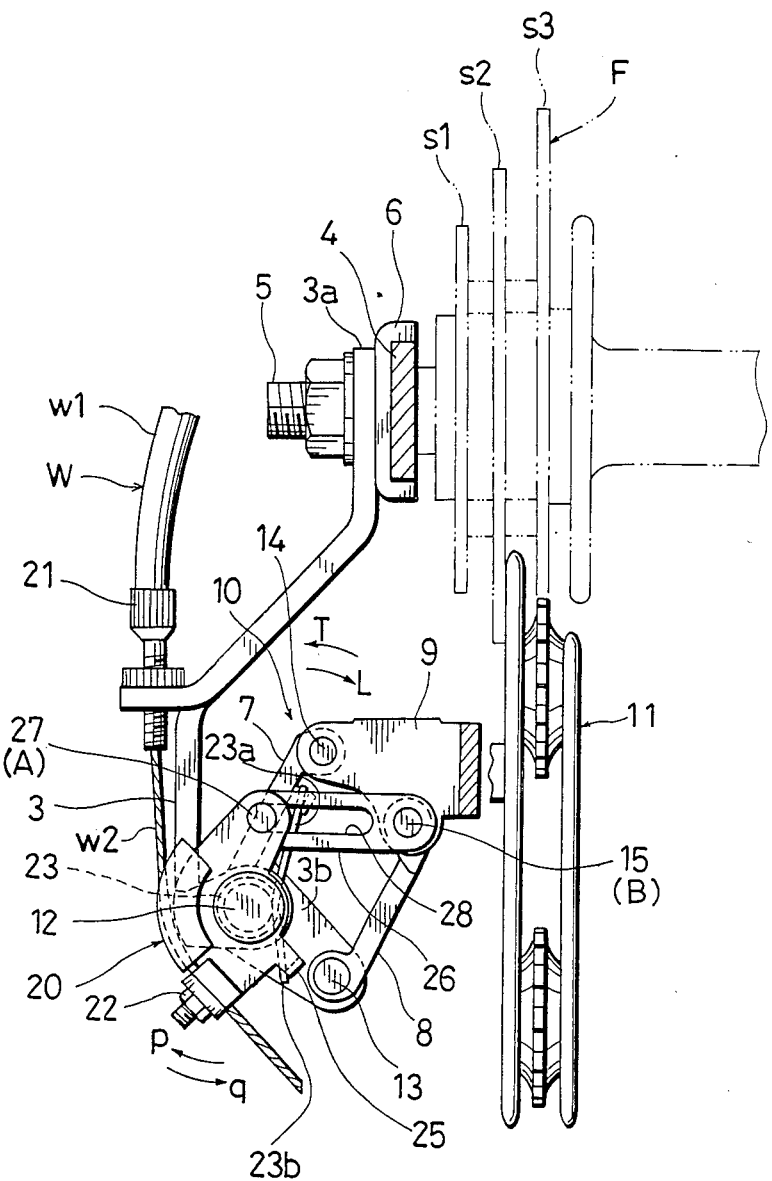
FIG. 4 is a view similar to FIG. 2 but showing the deraileur with its parallelogrammic linkage mechanism deformed for shifting.

In operation, the inner cable W2 of the double control cable W is pulled up by the unillustrated remote speed change lever relative to the outer cable w1 to pivot the operating member 20 in a direction of an arrow p in FIG. 2. Since the lower spring end 23b is arrested by the stopper projection 25 of the operating member 20, such pivotal movement of the operating member 20 causes the spring 23 to rotate in the same direction on the pin 12. Thus, the upper spring end 23a engaging with the stopper projection 24 on the first link 7 causes the parallelogrammic linkage mechanism 10 to pivotally deform in the arrow L direction, so that the shift frame 18 supported by the linkage mechanism 10 translates axially inwardly of the hub shaft 5 to shift the chain C (FIG. 1) from a smaller sprocket s1 or s2 (e.g. the smallest sprocket s1 in FIG. 2) to a larger sprocket s2 or s3 (e.g. the largest sprocket s3), as illustrated in FIG. 4.

During the above operation, the restraining link 26 functions in the following manner.

Figure 6:
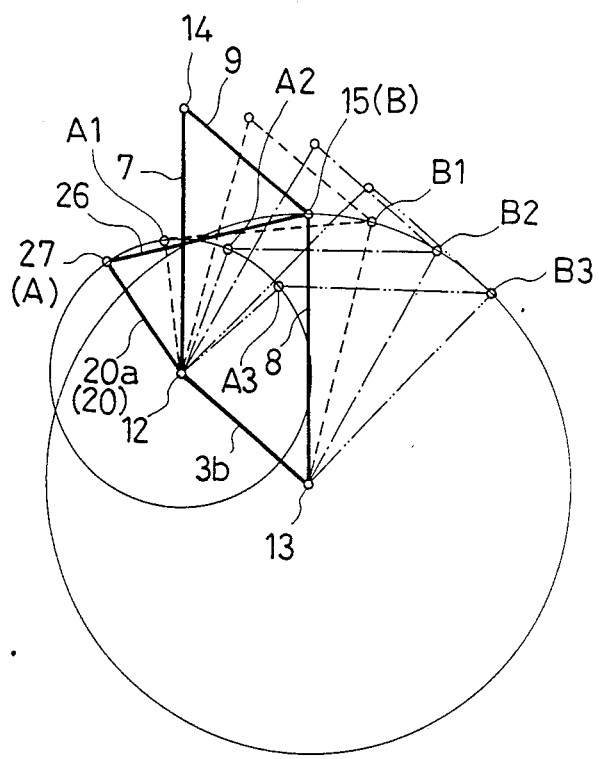
FIG. 6 is a diagrammatic illustration showing the function of a restraining link.

In FIG. 6, a smaller circle represents the locus of pivotal movement of the pin 27 or connecting point A on the operating member 20 or arm portion 20a thereof, whereas a larger circle indicates the locus of pivotal movement of the pin 15 or connecting point B on the second link 8. The two pins 27, 15 are connected by the restraining link 26 whose length is invariable. Supposing now that the arm portion 20a pivots through an angle of 30° for example, the pin 27 displaces to a point A1 on the smaller circle, whereas the pin 15 shifts to a point B1 on the larger circle. The distance between the two points A1, B1 is equal to that between the two points A, B since the length of the restraining link 26 is invariable. Similarly, if the arm portion 20a pivots through an additional angle of 30° or 60° for example, the pins 27, 15 moves respectively to different points A2, B2 or A3, B3 on the respective smaller and larger circles, the distance between the two points A2, B2 or A3, B3 being again equal to that between the initial two points A, B.

As apparently appreciated in FIG. 6, pivotal movement in any degree of the operating member 20 corresponds to a smaller degree of pivotal movement of the second link 8 (e.g. 90° for the operating member 20 vs. about 45° for the second link 8). In other words, the restraining link 26 serves to limit pivotal movement of the second link 8 to a degree smaller than expected from larger pivotal movement of the operating member 20 which is operatively connected to the parallelogrammic linkage mechanism 10 via the torsion spring 23a. The first link 7 makes the same pivotal movement as the second link 8 because they form two opposite sides of the parallelogrammic linkage mechanism 10.

As previously described, the upper end 23a of the spring 23 engages with the stopper projection 24 of the first link 7, while the lower spring end 23b engages with the stopper projection 25 of the operating member 20. Thus, upon pivotal movement of the operating member 20, the spring 23 is torsioned to store a restoring force since the first link 7 is pivoted to a smaller degree than the operating member 20, as explained with reference to FIG. 6. The degree of torsioning of the spring 23 is determined by the difference in pivotal angle between the operating member 20 and the first link 7. The difference in pivotal angle between the operating member 20 and the first link 7 (or the second link 8) is in turn determined firstly by the respective lengths of the restraining link 26, the second link 8 and the operating member arm portion 20a, and secondly by the positional relation between the pins 12, 13.

For comparison, it is now assumed that the spring end 20a is caught by the lower support portion 3b of the base member 3 but not by the stopper projection 24 of the first link 7, that the restraining link 26 is omitted, and that the operating member 20 is co-pivotable with the first link 7. In the thus hypothetically modified deraileur, which resembles a typical conventional deraileur in operating principle, the spring 23 is torsioned as much as the operating member 20 is pivoted.

According to the present invention, both the first link 7 arresting the upper spring end 20a and the operating member arresting the lower spring end 23b pivot in the same direction but to different degrees due to the limiting function of the restraining link 26. Therefore, the spring 23 is torsioned much more moderately than in the above comparative arrangement. This means that a weaker pull on the inner cable w2 of the double control cable W can displace the shift frame 11 axially inwardly of the hub shaft 5 to conduct a shift-up gear change.

When the inner cable w2 is freed from a pull, the operating member 20 is pivoted in the arrow q direction by the restoring force of the previously energized spring 23 to thereby bring the parallelogrammic linkage mechanism 10 to the original position shown in FIG. 2. As a result, the shift frame 18 carried by the linkage mechanism 10 is displaced axially outwardly of the hub shaft 5 to shift the chain C (FIG. 1) from a larger sprocket s3, s2 (largest sprocket s3 in FIG. 4) to a smaller sprocket s2, s1 (smallest sprocket s1 in FIG. 2).

Figure 5:
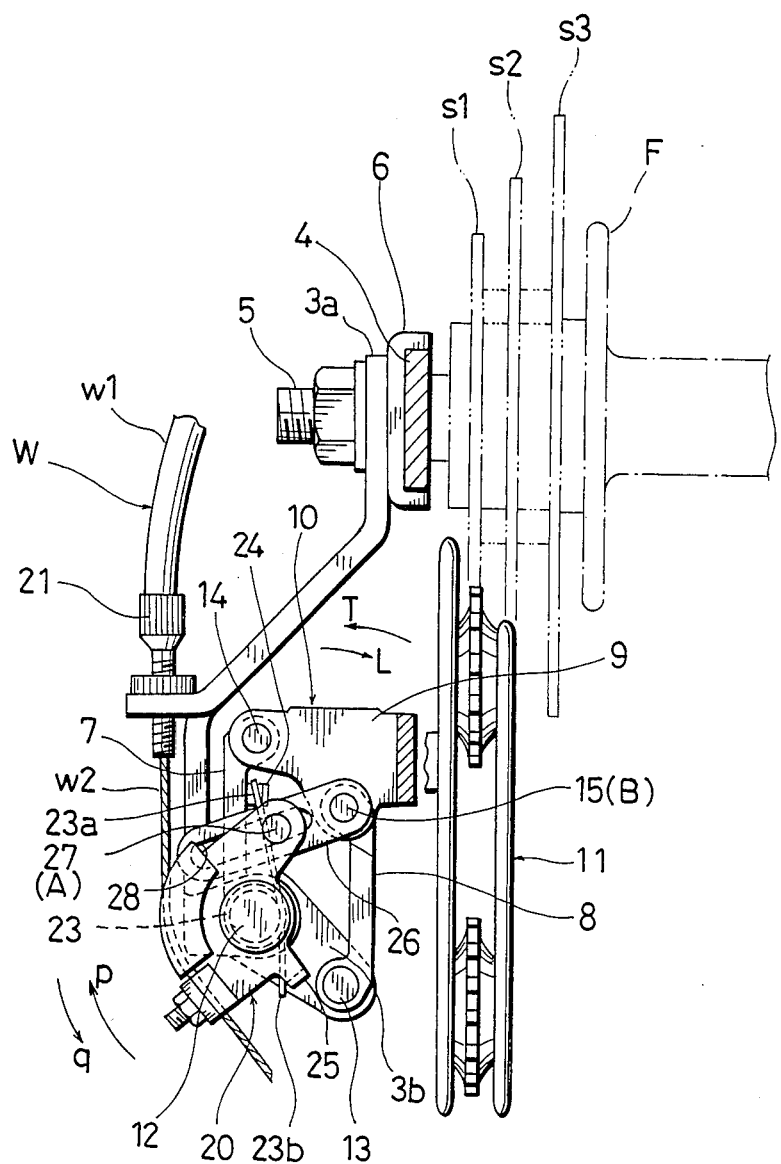
FIG. 5 is also a view similar to FIG. 2 but showing the deraileur in a pre-loaded condition.

If the bicycle is not running and the chain C (FIG. 1) is engaged for example on the smallest sprocket s1 of the non-rotating freewheel F, that particular sprocket s1 prevents the chain C or the chain guide mechanism 11 from moving axially of the hub shaft 5. Even in such an event, the inner cable W2 of the double control cable W can be pulled up to pivot the operating member 20 in the arrow p direction. However, since the parallelogrammic linkage mechanism 10 (chain guide mechanism 11) is prevented from lateral movement, such pivotal movement of the operating member 20 causes the pin 27 to slide within the elongated slot 28 of the restraining link 26 toward the pin 15, as illustrated in FIG. 5. In other words, the lower spring end 23b is pivoted by the operating member 20 in the arrow p direction relative to the non-pivotable upper spring end 23a to torsion the spring 23. Thus, immediately upon running of the bicycle, the linkage mechanism 10 is pivotally deformed by the restoring force of the previously torsioned spring 23 to shift the chain guide mechanism 11 axially inwardly of the hub shaft 5, consequently conducting a shift-up gear change.

According to the present invention, the single spring 23 can provide a restoring force as well as a pre-loading or pre-torsioning function for the parallelogrammic linkage mechanism 10. Further, the restoring force does not increase unacceptably despite large pivotal deformation of the linkage mechanism 10, thereby ensuring readier speed change operation.

According to the illustrated embodiment, the spring 23 functions to bring the chain guide mechanism 11 to a position immediately under the smallest sprocket s1. Such deraileur is called "top-normal type". However, the spring 23 may be arranged on the pin 12 in a manner such that it always urges the operating member 20 in the arrow p direction to bring the chain guide mechanism 11 to a position immediately under the largest sprocket. The thus modified deraileur is called "low-normal type".

Further, the operating member 20 may be reversed in orientation and pivotally supported on the pin 13 which pivotally connects the second link 8 to the lower support portion 3b of the base member 3. In this case, the spring 23 is mounted on the pin 13 and engages with the operating member 20 as well as with the second link 8 to urge the operating member 20 in the arrow p pivotal direction, while the restraining link 26 extends from the pin 27 of the operating member 20 to be pivotally connected to the pin 14 which pivotally connects the second link 7 to the movable member 9. Such a modification also provides a low-normal type deraileur.

Still further, the operating member 20 may be arranged on the movable member 9 with suitable rearrangement of the torsion spring 23 and the restraining link 26.

The invention being thus described, it is obvious that the same may be varied in many other ways. For instance, the restrained link 26 may be replaced by a wire or cam means which limits the maximum distance between the two points A, B but allows these to come closer to each other. Further, the connecting point B for the restraining link 26 may not be provided by the pin 15 but by another pin located at a suitable position on the movable member 9 or the second link 8. Such variations are not to be regarded as a departure from the spirit and scope of the invention, and all such modifications as would be obvious to those skilled in the art are intended to be included within the scope of the following claims.

We claim:
1. A bicycle deraileur comprising:
   a parallelogrammic linkage mechanism including a base member, a pair of parallel links each pivotally connected at one end thereof to said base member by means of a pin, and a movable member pivotally connected to the other end of said each link by means of a pin;
   a chain guide mechanism carried by said movable member;
   an operating member mounted on said linkage mechanism and operable by a cable to pivot about an axis parallel to said pins;
   a torsion spring arranged to engage with said operating member and one of said links, said spring elastically urging said operating member to counteract a tension applied to said cable; and
   restraining means connecting between a first connecting point on said operating member and a second connecting point on said linkage mechanism to convert pivotal movement of said operating member into smaller pivotal movement of said links, said restraining means allowing said first and second connecting points to move toward each other to torsion said spring.
2. The deraileur as defined in claim 1, wherein said operating member is pivotally mounted on the pin which connects said one link to said base member.
3. The deraileur as defined in claim 2, wherein said spring is supported on the pin connecting said one link to said base member, and said spring has one end engaging with a stopper projection provided on said one link, the other end of said spring engaging with another stopper projection provided on said operating member.
4. The deraileur as defined in claim 2, wherein said operating member has an arm portion, said first connecting point is provided by a pin mounted to said arm portion, and said second connecting point is provided by a pin mounted to said linkage mechanism at a location remote from said operating member and said one link.
5. The deraileur as defined in claim 4, wherein said restraining means is in the form of a restraining link pivotally connected at one end to said pin providing said second connecting point, and said restraining link has an elongated slot extending from the other end thereof toward said one end and slidably receiving said pin providing said first connecting point.
6. The deraileur as defined in claim 4, wherein said pin providing said second connecting point also serves as the pin which connects the other link to said movable member.
7. The deraileur as defined in claim 1, wherein said operating member has an arcuate guide portion for guiding said cable.

* * * * *